Feb. 13, 1945.   I. W. SIMPKINS ET AL   2,369,259
VEHICLE BRAKE MECHANISM
Filed Aug. 6, 1943    4 Sheets-Sheet 2
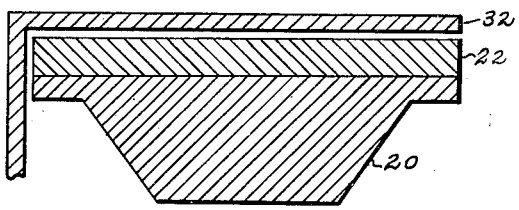
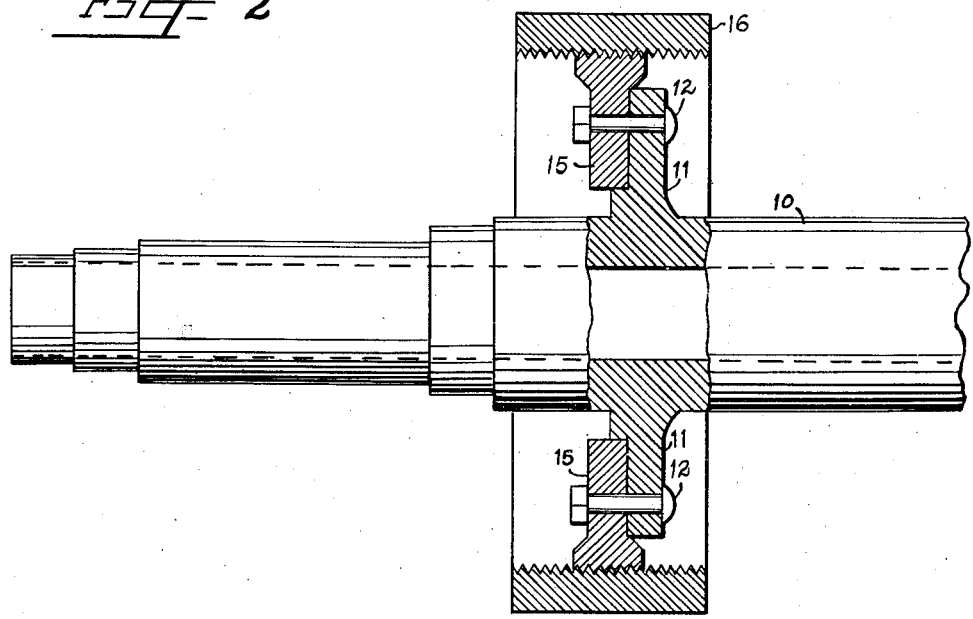
Fig. 2
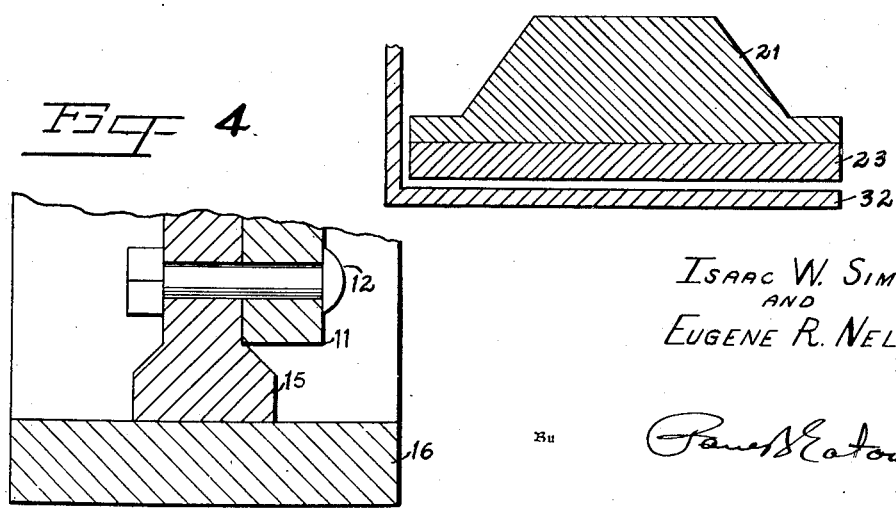
Fig. 4
Isaac W. Simpkins
AND
Eugene R. Nelson
Inventors
By
Attorney

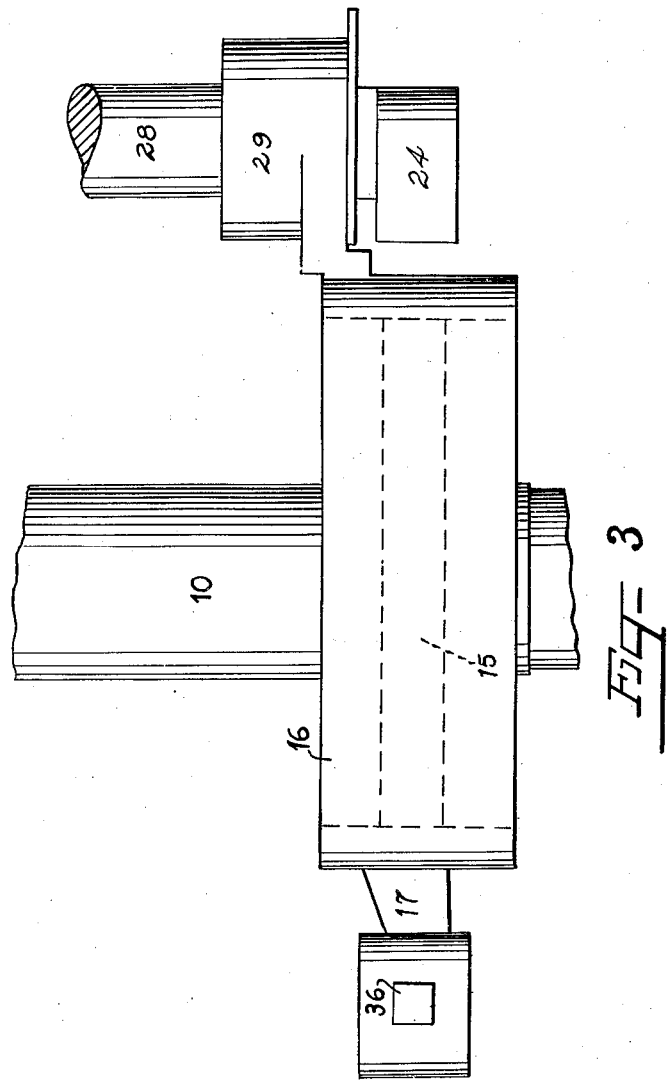

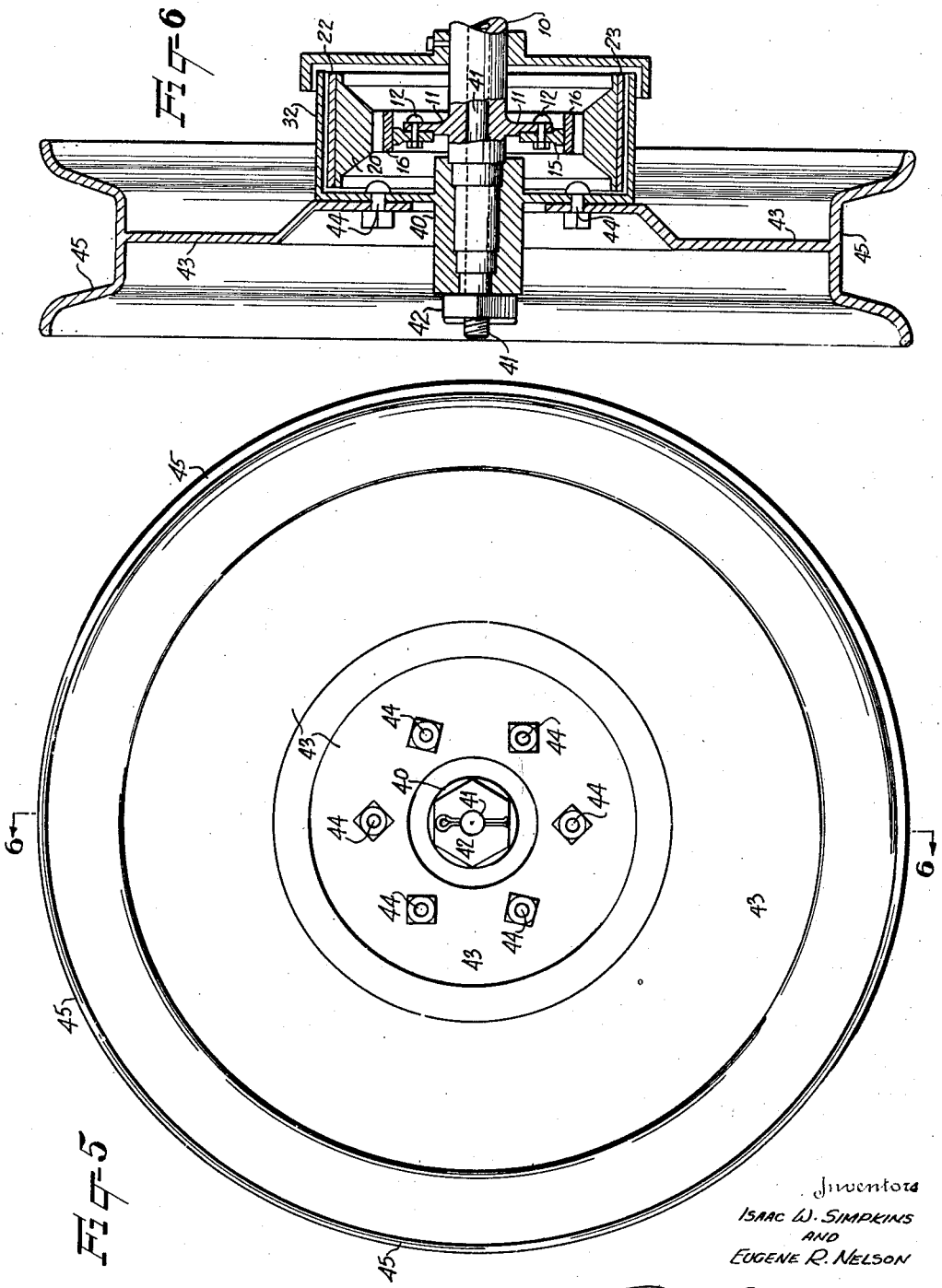

Patented Feb. 13, 1945

2,369,259

UNITED STATES PATENT OFFICE 2,369,259

VEHICLE BRAKE MECHANISM

Isaac W. Simpkins and Eugene R. Nelson, Charlotte, N. C.

Application August 6, 1943, Serial No. 497,586

5 Claims. (Cl. 188—205)

This invention relates to brake mechanism and more especially to means for mounting a brake mechanism on an automotive vehicle such as a truck, in such a manner that different sizes and widths of brake shoes may be installed on a truck and the like without the necessity of a difficult welding operation.

It is an object of this invention to provide means for mounting a braking mechanism on an axle of an automotive vehicle, such as a truck and the like so that the position of the braking mechanism may be adjusted longitudinally of the axle when it is desired to install a braking mechanism having brake blocks, brake drums, and brake bands of a size different from that with which the vehicle comes equipped from the factory.

It is another object of this invention to provide means for adjustably mounting a braking mechanism on an automotive vehicle so that the braking mechanism can be adjusted longitudinally of the axle without remodeling and rewelding portions of the axle holding flange mounted thereon.

Some of the objects of the invention having been stated, other objects will appear as the description proceeds, when taken in connection with the accompanying drawings, in which:

Figure 1 is a side elevation of the improved brake supporting mechanism looking from the outer end of the axle inwardly towards the vehicle;

Figure 2 is a vertical sectional view taken along the line 2—2 in Figure 1, and looking in the direction of the arrows, and showing a portion of a brake drum in addition, and showing bolts 12 instead of rivets 12a;

Figure 3 is a top plan view of the braking mechanism mounted on a vehicle axle housing and showing the brake shoe mechanism removed;

Figure 4 is an enlarged detail showing a modified form of the invention;

Figure 5 is an elevation of a wheel equipped with our invention and looking at the left hand side of Figure 6;

Figure 6 is a vertical sectional view taken along the line 6—6 in Figure 5.

Figure 1:
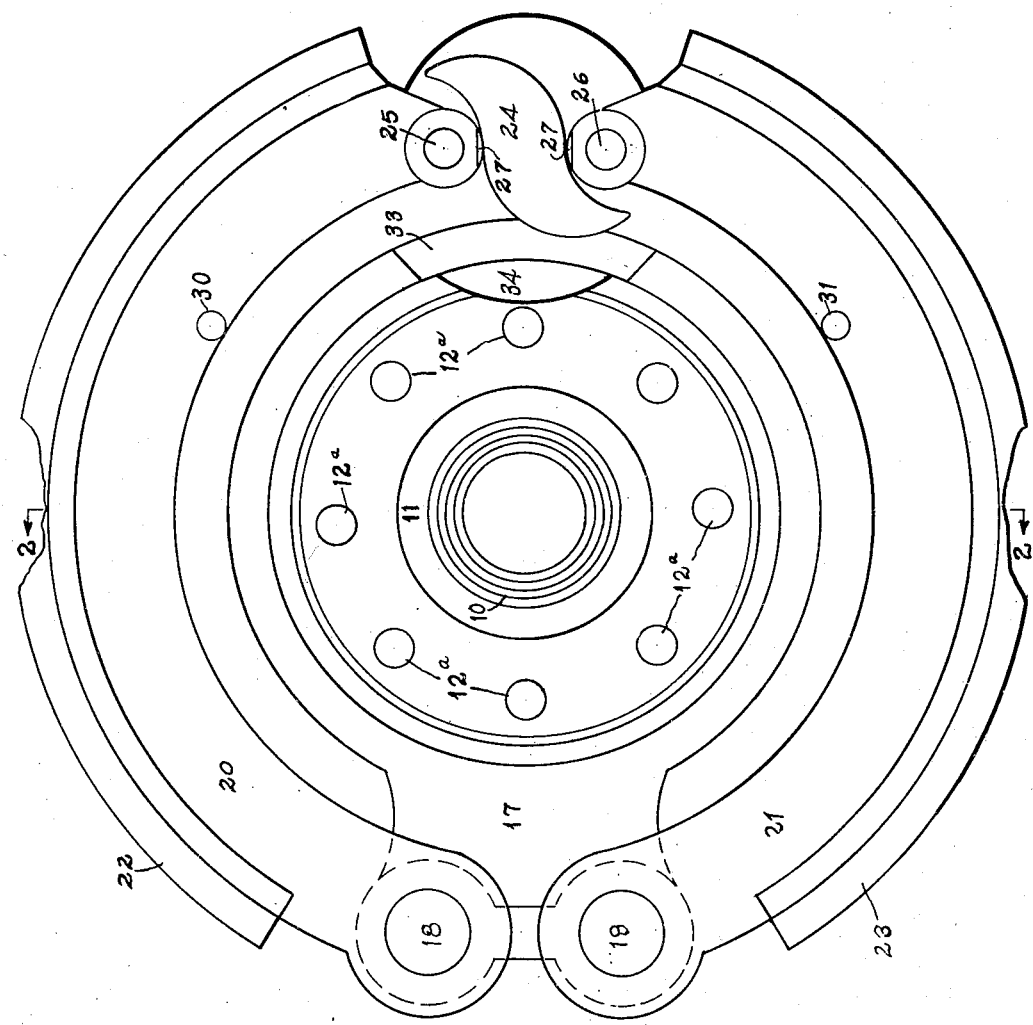

Referring more specifically to the drawings, the numeral 10 indicates a conventional rear axle housing of a vehicle, and also indicates a trailer or tractor axle. On the conventional axle, there is provided integral therewith a circular outstanding flange member 11 which is provided with a plurality of holes in which bolts or rivets 12a are mounted, the flange 11 and bolts 12 heretofore being employed for mounting a braking mechanism which has pivot bolts at one end for pivotally mounting the brake shoes and spreading cam means at the other end for spreading the brake shoes for applying the brakes.

Heretofore, it has been found that in certain automotive vehicles such as trucks, trailers, buses, and the like, where they come equipped with a certain width of brake drum on the wheel and a corresponding width of brake shoe, that the braking effect produced by such equipment is not sufficient for very heavy loads, and it has been the practice heretofore when it is desired to mount a broader or deeper brake drum on the wheel and supply the vehicle with broader brake shoes to cut the flange 11 from its axle by a blow torch or other suitable means, and move it back further on the axle to the right in Figure 2, and there reweld the flange 11 in position, so as to move the braking mechanism further inwardly towards the vehicle so that it can center inside the brake drum so that broader brake shoes when installed will be operated equally to apply equal braking effect on all portions of the drum. This is a very tedious operation, and requires great skill and much labor in rewelding the flange 11 in a perfectly true position.

It is a purpose of this invention to provide means associated with the conventional flange 11 on an axle whereby the braking mechanism can be mounted on this flange without removing the flange from the axle and readjusting the same and providing means whereby the braking mechanism can be adjusted longitudinally of the axis.

In the embodiment of the invention shown, there has been provided an annular member 15 which is secured to the conventional flange 11 by the conventional bolts 12 or rivets 12a. This annular member can have a hole through the center thereof of any desired size to properly fit the axle, and the holes in the annular member can be drilled to correspond to the holes in the flange 11 already on the axle. This annular member 15 has its periphery threaded preferably with a very fine thread, say for example, sixteen threads to the inch, and threadably mounted on this annular member 15 is a member 16. By rotating the member 16 on the annular member 15, the longitudinal position of the member 16 can be adjusted on the axle.

If desired, the annular members 15 and 16 can have smooth adjoining surfaces as shown in Figures 4 and 6, so the member 16 can be slid longitudinally of the axle and then welded in proper position.

The member 16 has projecting from one side thereof a portion 17 which is provided with a pair of pins 18 and 19 on which conventional brake shoes 20 and 21 are pivotally mounted. These brake shoes 20 and 21 are conventional, and are provided with suitable brake bands 22 and 23. The free ends of the brake shoes 20 and 21 have pins 25 and 26 therein on which are mounted rollers 27, only a very small portion of these rollers being shown in Figure 1, since these rollers and pins are conventional. These rollers are adapted at all times to press against a cam member 24 which is integral with a shaft 28 rotatably mounted in a projection 29 extending from the opposite end of the annular member 16 from which the projection 17 extends.

By conventional means, not shown, the shaft 28 may be oscillated or partially rotated to change the position of cam 24 to spread the free ends of brake shoes 20 and 21 apart from each other to press the brake bands 22 and 23 against the inside surface of a conventional brake drum 32 disposed on the wheel with which this braking mechanism is associated. The free ends of the brake shoes 20 and 21 are normally pressed against the cam 24 by means of a tension spring, not shown, which has its ends attached to pins 30 and 31 on the brake shoes 20 and 21 respectively.

The annular member 16 is preferably cut away as at 33 and also the annular member 15 is cut away as at 34 to provide room for swinging movement of the cam 24.

It is preferable practice to mount the annular member 15 on the conventional flange 11, and then with the annular member 16 in position on the annular member 15, the annular member 16 is rotated a sufficient number of times to cause its longitudinal position to be in a proper place on the axle to properly support the braking mechanism and to center it with respect to the drum on the wheel. When the mechanism is adjusted in proper position, the annular members 15 and 16 are secured together in a non-turning position by any suitable means such as by welding the two parts together at several points along their coinciding peripheries.

The brake shoes 20 and 21 are forked at their left-hand ends in Figure 1, and fit on opposite sides of the projection 17 in which the pins 18 and 19 are mounted. Suitable set screws 36 are employed for holding the pins 18 and 19 in position in the projection 17.

Instead of having the periphery of the annular member 15 threaded and the inside surface of the shoe supporting member 16 threaded, these two surfaces can be made smooth as shown in Figures 4 and 6 which shows Figure 2 in modified form, so that member 16 will have a sliding fit on member 15, and when the member 16 is adjusted to the proper longitudinal position on the axle, the members 15 and 16 can be welded together to not only hold the member 16 in its proper position longitudinally of the axle, but also to hold the member 16 in proper position to cause the brake applying shaft 28 and cam 24 to be in registering position with the braking mechanism of the vehicle.

Instead of using bolts 12 as shown in Figures 2 and 4, rivets 12a can be employed as shown in Figure 1 for securing the annular member 15 on the flange 11.

The brake drum is a part of a hub 40 which is rotatably mounted on the axle housing 10 and fixed on an axle 41 by locking nut 42 in the case of a rear axle or just rotatably mounted on a spindle (not shown) when applied to a front wheel. A conventional wheel 43 is fixed to the brake drum 32 by means of conventional bolts 44. Wheel 43 has a conventional rim 45 thereon for receiving a pneumatic casing.

In the drawings and specification, there has been set forth a preferred embodiment of the invention, and although specific terms are employed, they are used in a generic and descriptive sense only and not for purposes of limitation, the scope of the invention being defined in the claims.

I claim:

1. In a vehicle having an axle with a wheel rotatably mounted thereon, said wheel having a brake drum secured thereto, said axle having a peripheral flange integral therewith, an annular member rigidly secured to the flange, a brake shoe supporting member slidably mounted on the annular member for adjustment longitudinally of the axle and adapted to be fixed to the flange when in properly adjusted position, and a pair of expansible brake shoes secured on said shoe supporting member for engagement with said brake drum.

2. In a vehicle having an axle and wheels rotatably mounted on the axle and being provided with brake drums, said axle having a peripheral flange integral therewith, an annular member surrounding the axle and removably secured to said flange, a brake shoe supporting member threadably mounted on the periphery of said annular member for adjustment longitudinally of the axle by rotation of the brake shoe supporting member to properly position the brake shoes relative to the brake drum.

3. In a vehicle having an axle with wheels rotatably mounted on each end of the axle, said axle near its ends having a conventional brake assembly supporting flange, an annular member surrounding said axle and being bolted to the flange, the periphery of the annular member being threaded, a brake shoe supporting member having a threaded bore therethrough and threadably mounted on the annular member so that relative rotation between the annular member and the brake shoe supporting member will move the brake shoe supporting member longitudinally of the axle, and means for securing the annular member and the brake shoe supporting member against rotation relative to each other.

4. A vehicle brake mechanism in which the vehicle is provided with an axle, wheels rotatably mounted on the axle, and being provided with brake drums, said axle having a peripheral flange thereon, an annular member secured on said flange, a brake shoe supporting mechanism having a hole therethrough into which the annular member is adapted to fit, so that the brake shoe supporting mechanism can be slid longitudinally of the axle on said annular member and welded in proper position by welding the brake shoe supporting mechanism to the periphery of the annular member.

5. In an automotive axle housing adapted to have a wheel rotatably mounted thereon and having a peripheral flange integral with the exterior surface of the housing, an annular member fixedly mounted on the flange, a brake shoe supporting mechanism surrounding the annular member and movable longitudinally thereof and adapted to be fixedly and permanently secured to the flange when adjusted longitudinally of the axle housing to the desired position.

ISAAC W. SIMPKINS.
EUGENE R. NELSON.